July 1, 1930.    A. F. SHORE ET AL    1,768,639
GAUGE
Original Filed Oct. 9, 1924

Albert F. Shore
William F. Shore
INVENTORS

BY Geo. A. Hoffman,
THEIR ATTORNEY

Patented July 1, 1930

1,768,639

UNITED STATES PATENT OFFICE

ALBERT F. SHORE, OF NEW YORK, AND WILLIAM F. SHORE, OF FREEPORT, NEW YORK, ASSIGNORS TO THE SHORE INSTRUMENT & MFG. CO., OF JAMAICA, NEW YORK, A CORPORATION OF NEW YORK

GAUGE

Application filed October 9, 1924, Serial No. 742,516. Renewed November 23, 1929.

This invention relates to improvements in apparatus for measuring the hardness of materials generally and particularly to gauges for measuring and indicating the degree of penetration resistance; that is, the hardness of materials, especially of the harder grades.

The present invention is in the nature of an improvement upon or elaboration of that shown, described and claimed in United States Letters Patent No. 1,042,721, granted October 29, 1912, to William F. Shore, one of the joint-applicants herein. Said patent was directed to a gauge embodying indicating mechanism adapted to be actuated in different degrees in proportion to the penetration resistance or hardness of different materials tested thereby, the means employed therein for affecting said indicating mechanism, consisting of a casing carrying an indicating dial, and an external abutment through which extends a movable measuring pin provided with a suitable indenting-point, said pin acting against a spring contained in the said casing, the dial indications varying according to the amount of flexure communicated to the opposer spring as a result of the various degrees of compressive force opposed to the resistance of said spring.

The main object of the present invention is to provide mechanism of the class described which shall have improved means whereby the penetration resistance of different materials may be ascertained, such means including a plate-spring or disk, preferably oblong, adapted to be affected in proportion to the pressure exerted to indent materials to a predetermined degree.

Another object of the invention is to provide multiplying levers located between and in operative relation with the plate-spring and indicating means, said levers being adapted for magnifying the minute variations of movement of said spring when the spring is subjected to various degrees of pressure to ascertain the actual or comparative penetration resistance of materials.

Still another object of the invention is to provide means whereby all lost motion between the pressure point of the apparatus and the indicating dial is eliminated, thereby assuring instant readiness of response to pressures and accurate indication of such pressures.

The above-mentioned and other objects of the invention not hereinbefore referred to will be hereinafter described and claimed and are illustrated in the accompanying drawing, in which—

Figure 3:
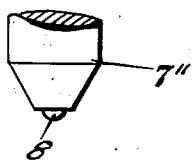
Figs. 3, 4 and 5 are detail views of the indentor-bar, partly broken away, and showing a ball-shaped point, a conical point and a frustrum, respectively, at the lower end thereof.

Referring to the drawing, our improved gauge is to be used with a pressure-clamp or support (not shown) having a pinion 3 mounted thereon; 4 designates a rack on the slide-bar 5; 6 a casing, preferably rectangular, attached to said slide-bar 5. The casing 6 is provided at its lower end with an internally-threaded hollow boss 6'. An externally-threaded sleeve 6" is shown within and in adjustable relation with the boss 6'. It will be noted that the sleeve 6" is provided with a graduated scale 6'" for permitting calculated adjustments thereof in the boss 6'. After the adjustments have thus been made, the sleeve is held firmly in the boss by the set-screw 7. The said sleeve is also provided with an abutment-stop 7' at its lower end. Slidable within the sleeve 6" is an indentor-bar 7", provided at its upper end with a comparatively-flat compensating inner contact-head 7'" and at its lower end with an indentor-point 8. A shoulder 8' on said indentor-bar 7" is adapted to limit longitudinal movement of the bar in the sleeve 6". A coiled spring 8" is shown interposed between the shoulder 8' and a shoulder on the interior of the sleeve 6″, to keep the indentor bar 7″ in contact with plate-spring 8‴.

Within the casing 6 and adapted to rest upon the comparatively flat contact-head 7‴ of the slidable indentor-bar 7″, is a plate spring 8‴, held against a comparatively-rigid bearing-plate 9, the latter being provided with knife-edge bearings 9′ for said spring 8‴. The plate 9 rests against the internal stop shoulders 10 on opposite sides of the casing. A leaf-spring 11 is interposed between the floor of the casing and the plate-spring 8‴ for holding the latter against the knife-edge bearings 9′ of the plate 9.

For magnifying the substantially microscopic movements communicated to the plate-spring 8‴ by the indentor-bar 7″, during the making of a test, we provide the following arrangement of parts, to wit:

A multiplying-lever 12, pivoted at 13 is provided with a countersunk portion 14, which portion engages the upper point of the transmitter-pin 15, the lower end of said pin resting upon the upper surface of the plate-spring 8‴. The transmitter-pin 15 extends through an opening in the central portion of the bearing-plate 9 and which central portion is provided with a projection 9″ having an opening and through which the said pin also extends. A toothed sector 16 on the end of the lever 12 is adapted to engage a pinion 17 pivoted on the pin 18. To the pinion 17 is attached a second multiplying-lever 19. A light spring 20 serves to press said second lever 19 down against the action of the lever 12 and also against the action of the springs 8‴, 11 and 8″.

A hollow boss 21 on the upper end of the casing 6 permits attachment thereto of a standard micrometer 22 or its equivalent.

The operation of the apparatus is as follows:

Having ascertained the proper projecting length of the indentor-point 8 from the abutment-stop 7′, the apparatus is pressed down on the substance, the penetration resistance or hardness of which is to be ascertained, whereupon the indentor-point 8, mounted in the indentor-bar 7″, will be pressed upward or inward until the abutment-stop 7′ rests upon the substance, material, or metal under test. At the same time, the upper end 7‴ of the indentor-bar 7″ will be pressed upward or inward against the stiff plate-spring 8‴, this pressure depending upon the amount of penetration resistance of the material or metal under test. Inasmuch as the hardness of the hardest metals is so much greater than the softer group, it would be difficult to include the entire range on one dial of a small portable instrument, without some compensating means. That is to say: in order to obtain an equal amount of discrimination on the dead soft material, a correspondingly soft spring would preferably be used, while for the full hard materials or metals, a correspondingly stiffer or stronger spring would preferably be used. This compensation is obtained by the use of the comparatively-flat contact-head 7‴, which forms part of the indentor-bar 7″. By proportioning the plate-spring 8‴ approximately as shown in the drawing, the said spring will have a higher fibre stress or be somewhat weaker at the middle or at a point intermediate its ends, and hence the point of contact of the contact-head 7‴ will widen more and more as the plate-spring 8‴ flexes and conforms with it under pressure of the indentor-bar 7″, thus shortening the outer ends of the plate-spring 8‴ and at the same time stiffening the said ends.

It is to be understood that a spring of this type is preferably used because of the substantially microscopic movements communicated thereto, which are, nevertheless, the direct result of extremely high pressures. All bending movements thus set up in the spring 8‴ between the bearing points 9′ of the bearing-plate 9, are communicated through the transmitter-pin 15 to the first multiplying-lever 12, thence to pinion 17 on the second multiplying-lever 19, and thence to the micrometer-indicator 22. The micrometer registers on the indicating-scale 25 the movements communicated to the movable pointer 24 when suitable mechanism (not shown) is actuated by the movements of the multiplying or magnifying levers 12 and 19 and plunger 26 and which levers are actuated during the making of a test for ascertaining or establishing the penetration resistance or hardness of the particular material, metal or substance under test. The plunger 26 is provided with a pointed lower end 27, and which rests upon, and is actuated by the second multiplying-lever 19. The plunger 26 is surrounded by a sleeve 28 in the hollow boss 21 at the upper part of the casing 6. All lost motion is eliminated and a perfect readiness of response secured by the employment of a light spring (not shown) within the micrometer 22 in conjunction with the light spring 20 pressing against the springs 8‴ and 8″ through the two multiplying-levers 12 and 19 and the centering-pin 15.

In the device described, readings are taken while the pressure at the abutment-stop 7′ and the indentor-point 8 is being applied. When such pressure is removed the indentor-point 8 will return to its initial projecting position.

Figure 4:
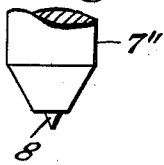
Figure 5:
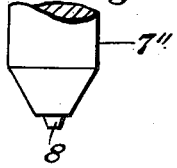
Figures 1, 2:
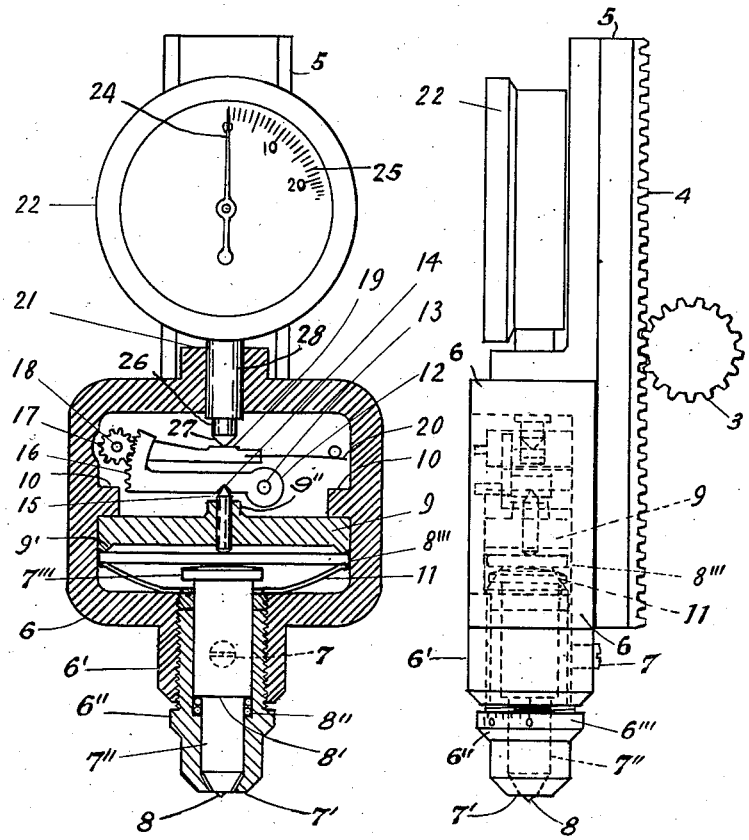
Figure 1 is a front elevation, partly in section, of our improved gauge, the indicating means whereof is shown as a standard micrometer gauge, such as is commonly employed for indicating fractions of an inch or milimeter.
Fig. 2 is a side elevation of the same, in full and dotted lines, showing the location of the principal operating parts of the gauge.

It is to be understood that we do not limit ourselves to the exact or precise form of construction shown in the drawing and described specifically herein; thus, the indentor-point 8 may be ball-shaped, conical or a frustrum (see Figs. 3, 4 and 5). Likewise, one or both of the multiplying-levers 12 and 19 may be eliminated and the pin 15 act directly on a standard micrometer-gauge of greater multiplying power or sensitivity, the ultimate object being to indicate as accurately as possible the magnification of the small or even microscopic movements communicated to the plate-spring 8'''.

What we claim is:

1. In a gauge, the combination of a casing, a hollow abutment-stop carried thereby, an indentor-bar adapted for upward and downward movement within said abutment-stop, said indentor-bar having a contact-head at its upper end and an indentor-point at its lower end, a rigid bearing a plate having knife-edge bearings, a plate-spring engaging said knife-edge bearings and also engaging the contact-head of the indentor-bar, a leaf-spring interposed between the plate-spring and the floor of the casing, and means adapted to magnify the movements of the indentor-bar and the plate-spring, respectively.

2. In a device for measuring the hardness of substances, the combination of a casing having internal stop-shoulders, a hollow abutment-stop carried by the casing, said abutment-stop having an opening, an indentor-bar adapted for movement up and down in the opening of said abutment-stop, said indentor-bar having a contact-head carried by the upper end thereof and an indentor-point carried by the lower end thereof, a comparatively-rigid plate-spring adapted to resist the upward movement of the indentor-bar when the latter is under pressure, a bearing-plate for said rigid plate-spring, knife-edge bearings on said bearing-plate spaced a predetermined distance apart, means including multiplying-levers adapted to magnify the movements of the indentor-bar and the plate-spring, respectively, an auxiliary spring for pressing the indentor-bar against the rigid plate-spring, and a leaf spring adapted to press said rigid plate-spring against the knife-edge bearings of the bearing-plate.

3. In a device for measuring the penetration resistance of substances, the combination of a casing having an internally-threaded boss, an externally-threaded sleeve in threaded engagement with said boss, said sleeve having a hollow abutment-stop at its lower end, an indentor-bar adapted for movement up and down in said sleeve, said indentor-bar having a contact-head and an indentor-point on its upper and lower ends, respectively, a strong plate-spring adapted to oppose the upward movement of the indentor-bar when the latter is under pressure, means for adjusting the position of said sleeve relatively to the point of the indentor-bar a spring for holding the indentor-bar against the plate-spring, a rigid bearing member having knife-edges spaced a predetermined distance apart and on opposite sides of said bearing member, a leaf-spring adapted to hold said plate-spring against the knife-edges of said bearing member, and means for magnifying the movements of the indentor-bar and the plate-spring, respectively.

4. In a device for measuring the penetration resistance of hard substances, the combination of a casing having an internally-threaded boss, an externally-threaded sleeve mounted therein and provided with an abutment-stop at the lower end thereof, a set-screw for holding the sleeve firmly in the boss, an indentor-bar freely movable up and down in said sleeve having a contact-head and an indentor-point, a strong plate-spring to be engaged by the contact-head and adapted to resist the inward movement of the indentor-bar when the indentor-point thereof is under pressure, means for permitting adjustment of said sleeve relatively to the indentor-bar, a spring adapted to hold the said indentor-bar in contact with the plate-spring, a fixed bearing member provided with knife-edges on opposite sides thereof, said bearing member having a projection at its central portion and an opening through said portion and projection, a spring adapted to hold the plate-spring against said knife-edges of said bearing member, a multiplying-lever, a pin between and contacting with the plate-spring and the said multiplying-lever, said pin extending through the opening in the bearing member and through the opening of the projection on said bearing member, a second multiplying-lever adapted to be actuated by the first lever, a light spring for opposing the inward movement of said second lever and also adapted to exert a mild pressure upon the first lever, the connecting-pin and the said plate-spring.

5. In apparatus for measuring the penetration resistance of substances, the combination of a casing having an internally threaded boss and internal stop-shoulders, an externally-threaded adjustable sleeve projecting from the boss of the casing, said sleeve having graduations thereon and also having an abutment-stop at the lower end of said sleeve, the latter being also provided with a stop-shoulder for limiting the upward movement of the sleeve and adapted to co-act with the boss of the casing when the said stop-shoulder comes into contact therewith, an indentor-bar adapted for inward and outward movement, respectively, in said sleeve, said indentor-bar having a comparatively-flat contact-head and a sharp point at its inner and outer ends, respectively, a highly-resistant plate-spring to be engaged by the contact-head and adapted to oppose the inward movement of the indentor-bar when the latter is under pressure, a stiff bearing-plate for said spring, said bearing-plate having knife-edges spaced a predetermined distance apart and on opposite sides thereof, and means for magnifying the movements of the indentor-bar and plate-spring, respectively.

6. In a device for measuring the hardness of substances, the combination of a casing having internal stop-shoulders on opposite sides thereof and hollow projecting bosses at the upper and lower ends thereof, said lower boss having internal screw-threads, an adjustable sleeve mounted in said lower boss and having external screw-threads and external graduations, a movable indentor-bar adapted for upward and downward movement in the adjustable sleeve, said indentor-bar being provided with a comparatively-flat compensating contact-head at its upper end and a sharp point at its lower end, a strong plate-spring to be engaged by the contact-head and normally holding the point said of indentor-bar in a protruding position from the end of the sleeve, and means for magnifying the movements of the indentor-bar and plate-spring, respectively.

7. In a device for measuring the hardness of substances, the combination of a casing having a hollow projecting boss thereon, an adjustable sleeve mounted in said boss and having graduations thereon, an indentor-bar movable up and down in said sleeve, said indentor-bar having a comparatively flat compensating contact-head and also having an indentor-point, a strong plate-spring to be engaged by the contact-head and adapted to hold the point of said indentor-bar in a position protruding from said sleeve, and means for magnifying the movements of the indentor-bar and its opposing plate-spring.

8. In a device for measuring the hardness of substances, the combination of a casing having internal stop-shoulders on opposite sides thereof and hollow projecting bosses at the upper and lower ends of the casing, said lower boss having internal screw-threads and said upper boss having a sleeve surrounding a plunger, an adjustable sleeve mounted in said lower boss, said sleeve having external screw-threads and external graduations, a movable indentor-bar adapted for upward and downward movement in said sleeve, said indentor-bar having a sharp point at its lower end and a comparatively flat top at its upper end, a plate-spring adapted to oppose the upward movement of the indentor-bar, and means for magnifying the movements of the indentor-bar and the plate-spring, respectively.

In testimony whereof we affix our signatures.

ALBERT F. SHORE.
WILLIAM F. SHORE.